US012064918B2

(12) United States Patent
Hasenzahl

(10) Patent No.: US 12,064,918 B2
(45) Date of Patent: Aug. 20, 2024

(54) STEREOLITHOGRAPHY APPARATUS FOR PREVENTING ADHESION OF A 3D-OBJECT TO THE VAT THROUGH OSCILLATORY EXCITATIONS

(71) Applicant: DENTSPLY SIRONA inc., York, PA (US)

(72) Inventor: Thomas Hasenzahl, Darmstadt (DE)

(73) Assignee: DENTSPLY SIRONA INC., York, PA (US)

( * ) Notice: Subject to any disclaimer, the term of this patent is extended or adjusted under 35 U.S.C. 154(b) by 366 days.

(21) Appl. No.: 17/435,597

(22) PCT Filed: Mar. 11, 2020

(86) PCT No.: PCT/EP2020/056500
§ 371 (c)(1),
(2) Date: Sep. 1, 2021

(87) PCT Pub. No.: WO2020/182881
PCT Pub. Date: Sep. 17, 2020

(65) Prior Publication Data
US 2022/0152915 A1  May 19, 2022

(30) Foreign Application Priority Data
Mar. 14, 2019 (EP) .................................... 19020125

(51) Int. Cl.
*B29C 64/124* (2017.01)
*B29C 64/30* (2017.01)
(Continued)

(52) U.S. Cl.
CPC ............ *B29C 64/124* (2017.08); *B29C 64/30* (2017.08); *B33Y 10/00* (2014.12); *B33Y 30/00* (2014.12); *B33Y 40/00* (2014.12)

(58) Field of Classification Search
CPC ... B29C 64/124; B29C 64/129; B29C 64/135; B29C 64/30; B33Y 30/00; B33Y 40/00
See application file for complete search history.

(56) References Cited

U.S. PATENT DOCUMENTS

2017/0210072 A1  7/2017  Rodriguez
2018/0243987 A1  8/2018  Nesbitt
(Continued)

FOREIGN PATENT DOCUMENTS

CN  109311222 A  2/2019
EP  3205484 A1  8/2017
(Continued)

OTHER PUBLICATIONS

JP3219608U-Machine Translation (Year: 2019).*
(Continued)

*Primary Examiner* — Yunju Kim
(74) *Attorney, Agent, or Firm* — DENTSPLY SIRONA INC.

(57) ABSTRACT

A stereolithography apparatus for generating a three-dimensional object from a photocurable substance, that includes: a vat for storing the photocurable substance; and a platform for supporting the three-dimensional object, wherein the platform is movable relative to the vat; an optical unit for sequentially projecting layered images towards the photocurable substance for hardening the photocurable substance deposited between the three-dimensional object and the bottom of the vat; and further includes: an oscillation unit adapted to horizontally oscillate the vat concomitantly with the projection of the layered images with a substantially constant amplitude that is smaller than the pixel size of the layered images in the horizontal direction for preventing adhesion of the three-dimensional object to the bottom of the vat.

5 Claims, 1 Drawing Sheet

(51) Int. Cl.
*B33Y 10/00* (2015.01)
*B33Y 30/00* (2015.01)
*B33Y 40/00* (2020.01)

(56) References Cited

U.S. PATENT DOCUMENTS

2019/0030796 A1* 1/2019 Oppenheimer ....... B29C 64/245
2020/0114577 A1* 4/2020 Satoh ..................... H05K 3/125

FOREIGN PATENT DOCUMENTS

| | | | |
|---|---|---|---|
| JP | H05-096631 A | 4/1993 | |
| JP | 3205484 B2 | 9/2001 | |
| JP | 2002210834 A | 7/2002 | |
| JP | 2016524556 A | 8/2016 | |
| JP | 3219608 U * | 1/2019 | ........... B29C 64/124 |
| WO | 2016172788 A1 | 11/2016 | |
| WO | 2018187874 A1 | 10/2018 | |

OTHER PUBLICATIONS

Jin et al. ("A vibration-assisted method to reduce separation force for stereolithography", Journal of Manufacturing Processes 34, 2018, 793-801) (Year: 2018).*
International Search Report; PCT/EP2020/056500; Jun. 10, 2020 (completed); Jun. 19, 2020 (mailed).
International Preliminary Report on Patentability; PCT/EP2020/056500; Jun. 10, 2020 (completed); Jun. 19, 2020 (mailed).
Written Opinion of the International Searching Authority; PCT/EP2020/056500; Jun. 10, 2020 (completed); Jun. 19, 2020 (mailed).
Japanese Office Action dated Jan. 16, 2024.

* cited by examiner

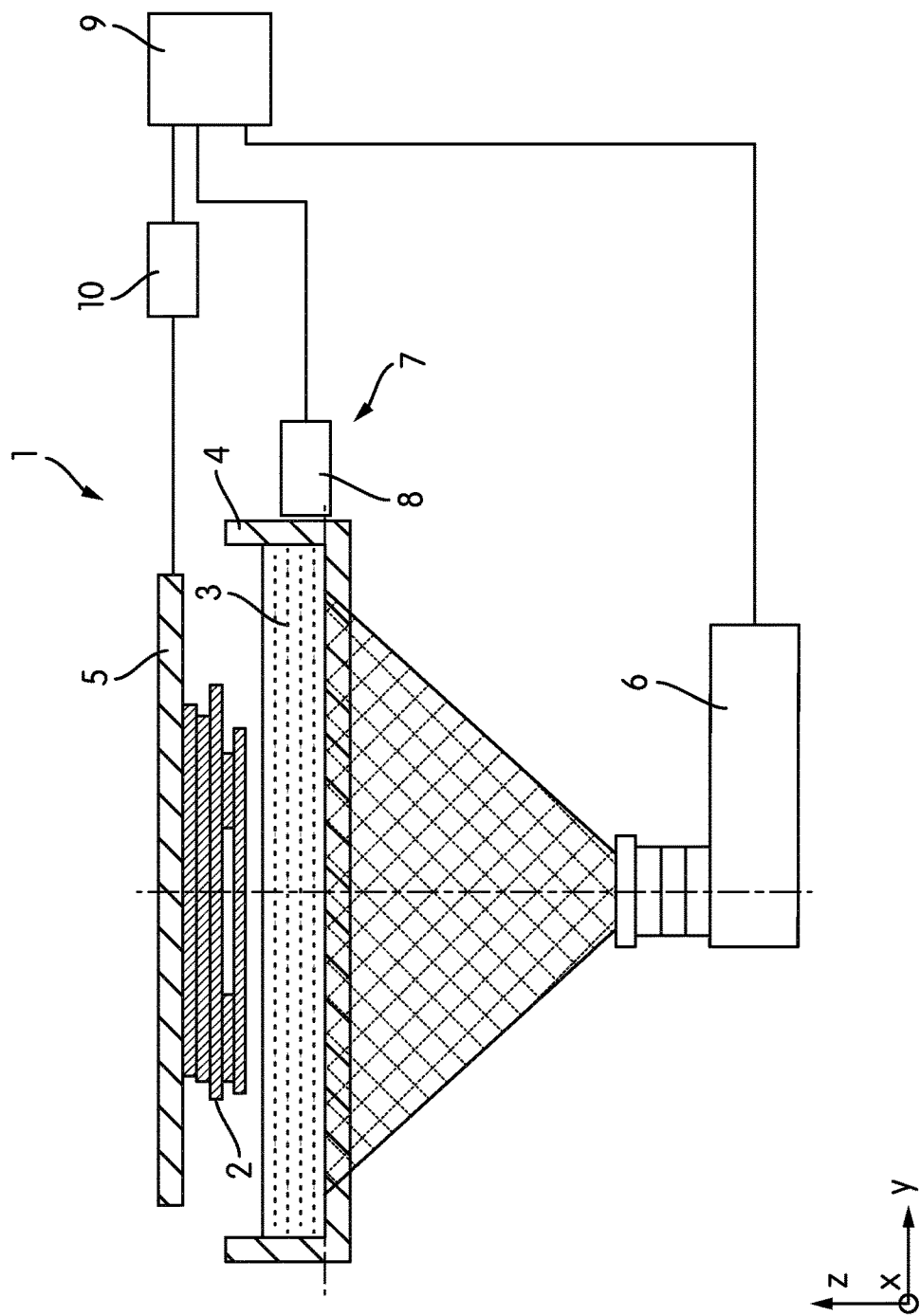

STEREOLITHOGRAPHY APPARATUS FOR PREVENTING ADHESION OF A 3D-OBJECT TO THE VAT THROUGH OSCILLATORY EXCITATIONS

CROSS-REFERENCE TO RELATED APPLICATIONS

This is a National Phase application of International Application No. PCT/EP2020/056500, filed Mar. 11, 2020, which claims the benefit of and priority to European Application Ser. No. 19020125.1, filed on Mar. 14, 2019, which are herein incorporated by reference for all purposes.

TECHNICAL FIELD OF THE INVENTION

The present invention relates to a stereolithography apparatus for generating three dimensional objects from a photocurable substance in a vat. The present invention more particularly relates to the techniques for preventing adhesion of a three-dimensional object to the bottom of the vat.

BACKGROUND ART OF THE INVENTION

A stereolithography apparatus is used for the manufacturing of a 3D object with a desired shape through exposing, either stepwise or continuously, a photocurable substance e.g., a liquid monomer in a vat, with layered images that can be generated, for example by digital masks or by scans of a laser beam in the ultraviolet region. The basic principle of stereolithography is also commonly called rapid prototyping or 3D printing. For the stereolithographic manufacturing, pixel-based displays that create digital masks, or laser beams in conjunction with controllable micromirrors can be alternatively used to project layered images, particularly pixel-based layered images, into a reference surface in the photocurable substance to harden it stepwise or continuously. The reference surface is defined through the focal layer in which the curing of the photocurable substance occurs and a cured layer is formed. Depending on the application, the cured layer can have a rigid or flexible consistency and is generally located on the bottom of the vat within the volume of the fluid photocurable substance. The cured layer is initially transferred through adhesion in a polymerization process to a platform which is relatively movable with respect to the vat. During the exposure, the cured layer also sticks to the bottom of the vat. After the exposure, the cured layer must be detached from the bottom of the vat so that fresh photocurable substance can flow between the last cured layer i.e., the polymerization front and the bottom of the vat. The cured layer is generally detached from the bottom of the vat through tilting or moving the vat relative to the platform holding the 3D object. Thereafter, the inflowing photocurable substance is cured by the subsequent exposure. These steps are repeated until the 3D object has been generated in accordance with the projected layered images. In a commonly known technique, the bottom of the vat is covered with an elastic film from which the 3D object can be more easily peeled off when the vat is tilted or moved. In another commonly known technique, special materials which are oxygen permeable are used in the bottom of the vat, and the 3D object model can be prevented from sticking to the bottom of the vat. However, such oxygen permeable vats are comparatively expensive.

US 2017/0210072A1 discloses a system for additive manufacturing of a homogenous optical element with reduced scattering and diffraction effects through quasi-random transverse vibration of the DLP projector and the resin tank. The random amplitude has a size of 1.5 pixels.

WO 2016/172788A1 discloses a stereolithography system having a resin tank with a pair of upwardly and downwardly vibrating ultrasonic transducers for tilting the resin tank after the exposure to peel away the manufactured object.

US 2018/0243987A1 discloses an additive manufacturing system having an ultrasonic vibrator connected to the vat which is vibrated to separate the manufactured object from the window of the vat after completion of the slices.

WO2018/187874 A1 discloses a stereolithography system having tactical transducers placed on the corners of the resin vat to help releasing the cured object from the vat with an amplitude of vibration in the direction of the printed-layer thickness. EP3205484 A1 discloses a three-dimensional printing machine having a vibrating means to promote the detachment of the printed object from the bottom of the resin tank after printing.

SUMMARY OF THE INVENTION

An objective of the present invention is to overcome the disadvantages of the prior art and provide a stereolithography apparatus in which the adhesion of the 3D object on the bottom of the vat can be effectively prevented during the exposure in a less complex way.

This objective has been achieved through the stereolithography apparatus as defined in claim 1. The dependent claims relate to further developments.

The present stereolithography apparatus of the present invention is suitable for generating a three-dimensional object from a photocurable substance and comprises a vat for storing the photocurable substance; a platform for supporting the three-dimensional object, wherein the platform is movable relative to the vat; an optical unit for sequentially projecting layered images towards the photocurable substance for hardening the photocurable substance deposited between the three-dimensional object and the bottom of the vat; and an oscillation unit that is adapted to horizontally oscillate the vat concomitantly with the projection of the layered images with a substantially constant amplitude that is smaller than the pixel size of the layered images in the horizontal direction for preventing adhesion of the three-dimensional object to the bottom of the vat.

The major advantageous effect of the present invention is that the 3D object can be prevented from sticking to the bottom vat during the exposure by the concomitant oscillatory excitations. Thereby the need for tilting or moving the vat after the exposure can be obviated, and thus the manufacturing process can be further expedited. Also, the need for using oxygen permeable vats, elastic foils can be omitted, and the manufacturing costs can be comparatively reduced.

According to the present invention, the vat may be continually oscillated also between the successive exposures i.e., during generation pauses to cause the fluid photocurable substance, namely the resin to refill the gap between the last cured layer and the bottom of the vat more quickly. Thereby, the generation pause periods can be comparatively shortened and the manufacturing process can be further expedited.

According to an embodiment of the present invention, the oscillation unit oscillates the vat horizontally during the generation process and/or in the generation pauses. Thereby the fluid photocurable substance can be more effectively prevented from sticking to the vat. And the gap can be more effectively refilled by the fluid photocurable substance.

According to an embodiment of the present invention, the oscillation unit oscillates the vat with an amplitude that is smaller than the pixel size of the layered images and a frequency which is higher than the exposure frequency of the layered images. Thereby, the blurring of the 3D object can be effectively reduced.

According to an embodiment of the present invention the oscillation unit has at least one actuator which oscillates the vat. The actuator may be directly linked to the vat or the support of the vat. The vat is preferably exchangeably mounted to the support. The actuator is controlled by the control unit of the stereolithography apparatus based on the layered images, the pixel size, the exposure time, the viscosity of the photocurable substance and the like. The actuator may be piezoelectric. Other type of actuators known to those skilled in the art may be alternatively used.

BRIEF DESCRIPTION OF THE DRAWINGS

In the subsequent description, further aspects and advantageous effects of the present invention will be described in more detail by using exemplary embodiments and referring to the drawings, wherein FIG. 1—shows a stereolithography apparatus according to an embodiment of the present invention.

DETAILED DESCRIPTION OF THE INVENTION

The reference numbers shown in the drawings denote the elements as listed below and will be referred to in the subsequent description of the exemplary embodiments:
1. Stereolithography apparatus
2. 3D object
3. Photocurable substance
4. Vat
5. Platform
6. Optical unit
7. Oscillation unit
8. actuator
9. Control unit
10. Driving unit FIG. 1 shows a stereolithography apparatus (1) for generating a three-dimensional object (2) from a photocurable substance (3). All processes in the stereolithography apparatus (1) are controlled through the control unit (9). The photocurable substance (3) is stored in a vat (4). The vat (4) is arranged on a support. An optical unit (6) sequentially projects layered images towards the photocurable substance (3) for hardening the photocurable substance (3) deposited between the three-dimensional object (2) and the bottom of the vat (4). An oscillation unit (7) oscillates the vat (4) concomitantly with the projection of the layered images for preventing adhesion of the three-dimensional object (2) to the bottom of the vat (4). The three-dimensional object (2) is supported by a platform (5). The platform (5) is movable relative to the vat (4) through a driving unit (10).

The oscillation unit (7) oscillates the vat (4) along the horizontal direction, preferably in the X direction and/or Y direction. The amplitude and frequency of the oscillation are controlled by the control unit (9) based on the type of the photocurable substance (3) and the layered images, particularly the pixel size and the exposure frequency. The amplitude of the oscillation is preferably smaller than the pixel size of the layered images. The frequency of the oscillation is preferably higher than the exposure frequency of the layered images. The exposure frequency is inversely proportional to the exposure time of each layer image.

According to an embodiment of the present invention the oscillation unit (7) has at least one actuator (8) which oscillates the vat (4). The actuator (8) may be linked directly to the vat (4). Alternatively, the actuator (8) may be linked to the support of the vat (4).

According to an embodiment of the present invention the actuator (8) may comprise an electromechanical actuator. A piezoelectric actuator may be used. Alternatively, an electroactive polymer actuator may be used. Alternatively, a magnetorestrictive actuator may be used.

The invention claimed is:

1. A stereolithography apparatus for generating a three-dimensional object from a photocurable substance, comprising: a vat for storing the photocurable substance; a platform for supporting the three-dimensional object, wherein the platform is movable relative to the vat; an optical unit for sequentially projecting layered images towards the photocurable substance for hardening the photocurable substance deposited between the three-dimensional object and the bottom of the vat; an oscillation unit and a control unit configured to control the oscillation unit to horizontally oscillate the vat concomitantly with the projection of the layered images with an amplitude that is smaller than the pixel size of the layered images in the horizontal direction for preventing adhesion of the three-dimensional object to the bottom of the vat, wherein the control unit is further configured to control the oscillation unit to oscillate with the vat with a frequency which is equal to or higher than the exposure frequency of the layered images such that a blurring of the 3D object is reduced relative to a blurring obtained without oscillating the vat with the frequency.

2. The stereolithography apparatus according to claim 1, wherein the oscillation unit comprises at least one actuator adapted to oscillate the vat, wherein the actuator is either directly linked to the vat or to a support of the vat.

3. The stereolithography apparatus according to claim 2, wherein the actuator is piezoelectric.

4. A method comprising:
generating the three-dimensional object using the stereolithography apparatus of claim 1.

5. A method of operating a stereolithography apparatus for generating a three-dimensional object from a photocurable substance, comprising:
providing the stereolithography apparatus comprising: a vat; a platform; an optical unit; and, an oscillation unit;
storing the photocurable substance in the vat;
supporting the three-dimensional object using the platform which is movable relative to the vat;
sequentially projecting layered images towards the photocurable substance using the optical unit so as to harden the photocurable substance deposited between the three-dimensional object and the bottom of the vat;
preventing adhesion of the three-dimensional object to the bottom of the vat and reducing blurring of the three-dimensional object by horizontally oscillating the vat using the oscillation unit concomitantly with the projection of the layered images through:
obtaining information about a pixel size of the layered images;
obtaining information about an exposure frequency of the layered images, the exposure frequency being proportional to an exposure time of each layer image; and
horizontally oscillating the vat with an amplitude that is smaller than the pixel size, and with a frequency that is equal to or higher than the exposure frequency, wherein the reducing blurring is relative to a blurring of the three-dimensional object when the vat is not horizontally oscillated with said frequency.

* * * * *